(12) United States Patent
Suh et al.

(10) Patent No.: US 7,917,958 B2
(45) Date of Patent: Mar. 29, 2011

(54) RECORDING MEDIUM WITH COPY PROTECTION INDICATING INFORMATION AND APPARATUS AND METHODS FOR FORMING, RECORDING, REPRODUCING AND RESTRICTING REPRODUCTION OF THE RECORDING MEDIUM

(75) Inventors: Sang Woon Suh, Seoul (KR); Jin Yong Kim, Kyunggi-do (KR)

(73) Assignee: LG Electronics Inc., Seoul (KR)

( * ) Notice: Subject to any disclaimer, the term of this patent is extended or adjusted under 35 U.S.C. 154(b) by 1363 days.

(21) Appl. No.: 11/367,599

(22) Filed: Mar. 6, 2006

(65) Prior Publication Data

US 2006/0156038 A1 Jul. 13, 2006

Related U.S. Application Data

(62) Division of application No. 10/762,536, filed on Jan. 23, 2004.

(51) Int. Cl.
  *G06F 7/04* (2006.01)
  *G06F 17/30* (2006.01)
  *G06F 12/14* (2006.01)

(52) U.S. Cl. ............... 726/26; 726/27; 726/31; 726/32; 726/33; 713/189

(58) Field of Classification Search ............. 713/189; 726/26–27, 31–33
See application file for complete search history.

(56) References Cited

U.S. PATENT DOCUMENTS

| | | | |
|---|---|---|---|
| 4,879,707 A | 11/1989 | Getreuer et al. | |
| 5,295,127 A | 3/1994 | Verboom et al. | |
| 5,572,507 A | 11/1996 | Ozaki et al. | |
| 5,596,639 A | 1/1997 | Kikinis | |
| 5,689,486 A | 11/1997 | Shimizu et al. | |
| 5,703,859 A | 12/1997 | Tahara et al. | |
| 5,706,268 A | 1/1998 | Horimai | |
| 5,737,286 A | 4/1998 | Timmermans et al. | |
| 5,799,501 A | 9/1998 | Leonard et al. | |
| 5,802,174 A | 9/1998 | Sako et al. | |
| 5,809,006 A | 9/1998 | Davis et al. | |
| 5,818,805 A | 10/1998 | Kobayashi et al. | |
| 5,848,050 A | 12/1998 | Nagasawa et al. | |
| 5,878,007 A | 3/1999 | Matsumoto et al. | |
| 5,892,797 A | 4/1999 | Deng | |
| 5,894,463 A | 4/1999 | Okawa et al. | |
| 6,021,199 A | 2/2000 | Ishibashi | |

(Continued)

FOREIGN PATENT DOCUMENTS

CN 1152170 6/1997

(Continued)

OTHER PUBLICATIONS

Office Acton for corresponding Chinese Application No. 200480000399.8 dated Sep. 1, 2006 and European Search Report and Supplementary European Search Report.

(Continued)

*Primary Examiner* — Benjamin E Lanier
(74) *Attorney, Agent, or Firm* — Harness, Dickey & Pierce

(57) ABSTRACT

A recording medium, such as a high-density and/or read-only recording medium, such as BD-ROM, which includes copy protection indicating information, which can identify whether copy protection information is needed or not for the playback of contents stored on the recording medium, and to methods and apparatuses for forming, recording, and reproducing data on the recording medium.

16 Claims, 6 Drawing Sheets

U.S. PATENT DOCUMENTS

| | | | |
|---|---|---|---|
| 6,031,815 | A | 2/2000 | Heemskerk |
| 6,072,758 | A * | 6/2000 | Tajiri .................. 369/53.22 |
| 6,150,888 | A | 11/2000 | Nakazawa |
| 6,215,759 | B1 | 4/2001 | Tanoue et al. |
| 6,223,247 | B1 | 4/2001 | Otsuka et al. |
| 6,223,285 | B1 | 4/2001 | Komuro et al. |
| 6,289,102 | B1 | 9/2001 | Ueda et al. |
| 6,353,890 | B1 | 3/2002 | Newman |
| 6,516,064 | B1 | 2/2003 | Osawa et al. |
| 6,519,213 | B1 | 2/2003 | Song et al. |
| 6,538,982 | B1 | 3/2003 | Van Vlerken et al. |
| 6,549,495 | B1 | 4/2003 | Spruit et al. |
| 6,550,009 | B1 | 4/2003 | Uranaka et al. |
| 6,664,526 | B2 | 12/2003 | Yokoi |
| 6,694,023 | B1 | 2/2004 | Kim |
| 6,708,299 | B1 | 3/2004 | Xie |
| 6,738,342 | B2 | 5/2004 | Furumiya et al. |
| 6,847,604 | B2 | 1/2005 | Ueki |
| 6,885,629 | B2 | 4/2005 | Oshima et al. |
| 6,930,977 | B1 | 8/2005 | Kondo et al. |
| 6,938,162 | B1 | 8/2005 | Nagai et al. |
| 7,006,416 | B1 | 2/2006 | Ohgake |
| 7,142,494 | B2 | 11/2006 | Sako et al. |
| 7,248,558 | B2 | 7/2007 | Kobayashi et al. |
| 7,266,074 | B2 | 9/2007 | Kim et al. |
| 2001/0010666 | A1 | 8/2001 | Miyamoto et al. |
| 2001/0036132 | A1 | 11/2001 | Kobayashi et al. |
| 2001/0046193 | A1 | 11/2001 | Akiyama et al. |
| 2002/0024914 | A1 | 2/2002 | Kobayashi |
| 2002/0031079 | A1 | 3/2002 | Kato |
| 2002/0041686 | A1 | 4/2002 | Moriyama et al. |
| 2002/0048241 | A1 | 4/2002 | Kumagai et al. |
| 2002/0048246 | A1 | 4/2002 | Yamaguchi et al. |
| 2002/0076047 | A1 | 6/2002 | Ando et al. |
| 2002/0080960 | A1 | 6/2002 | Kanayama et al. |
| 2002/0089920 | A1 | 7/2002 | Gotoh et al. |
| 2002/0097871 | A1 | 7/2002 | Gotoh et al. |
| 2002/0144114 | A1 | 10/2002 | Barnard et al. |
| 2002/0181358 | A1 | 12/2002 | Sako |
| 2003/0007432 | A1 | 1/2003 | Minamino et al. |
| 2003/0012375 | A1 | 1/2003 | Sako et al. |
| 2003/0048725 | A1 | 3/2003 | Lee et al. |
| 2003/0053404 | A1 | 3/2003 | Kondo |
| 2003/0117920 | A1 | 6/2003 | Sako et al. |
| 2003/0174605 | A1 | 9/2003 | Sako et al. |
| 2003/0185128 | A1 | 10/2003 | Shoji et al. |
| 2004/0076110 | A1 | 4/2004 | Hino et al. |
| 2004/0120247 | A1 | 6/2004 | Lee et al. |
| 2004/0151091 | A1 | 8/2004 | Ma et al. |
| 2005/0018555 | A1 | 1/2005 | Sabi et al. |
| 2005/0099916 | A1 | 5/2005 | Jeon et al. |
| 2005/0122889 | A1 | 6/2005 | Kobayashi et al. |

FOREIGN PATENT DOCUMENTS

| | | |
|---|---|---|
| CN | 1293810 | 5/2001 |
| CN | 1362707 | 8/2002 |
| EP | 0 545 472 | 6/1993 |
| EP | 0 299 573 | 10/1993 |
| EP | 0723216 | 7/1996 |
| EP | 0756279 | 1/1997 |
| EP | 0 807 929 | 11/1997 |
| EP | 0898271 | 2/1999 |
| EP | 0 936 610 | 8/1999 |
| EP | 0997899 | 5/2000 |
| EP | 1 028 423 | 9/2000 |
| EP | 1 058 254 | 12/2000 |
| EP | 1 067 540 | 1/2001 |
| EP | 1 122 729 | 8/2001 |
| EP | 1152412 | 11/2001 |
| EP | 1 168 312 | 1/2002 |
| EP | 1168328 | 1/2002 |
| EP | 1 229 537 | 8/2002 |
| JP | 05-036194 | 2/1993 |
| JP | 05-325193 | 12/1993 |
| JP | 07-272282 | 10/1995 |
| JP | 08-124171 | 5/1996 |
| JP | 08-147704 | 6/1996 |
| JP | 09-081938 | 3/1997 |
| JP | 09-128874 | 5/1997 |
| JP | 10-003746 | 1/1998 |
| JP | 10-172149 | 6/1998 |
| JP | 10-269577 | 10/1998 |
| JP | 11-066739 | 3/1999 |
| JP | 11-086436 | 3/1999 |
| JP | 11-261950 | 9/1999 |
| JP | 11-317002 | 11/1999 |
| JP | 2000-149415 | 5/2000 |
| JP | 2000-195049 | 7/2000 |
| JP | 2000-195094 | 7/2000 |
| JP | 2000-231722 | 8/2000 |
| JP | 2000-298941 | 10/2000 |
| JP | 2001-135021 | 5/2001 |
| JP | 2001-167517 | 6/2001 |
| JP | 2001-189051 | 7/2001 |
| JP | 2001-243355 | 9/2001 |
| JP | 2001-256678 | 9/2001 |
| JP | 2001-332031 | 11/2001 |
| JP | 2001-344765 | 12/2001 |
| JP | 2002-042347 | 2/2002 |
| JP | 2002-163857 | 6/2002 |
| JP | 2002-190159 | 7/2002 |
| JP | 2002-197674 | 7/2002 |
| JP | 2002-197789 | 7/2002 |
| JP | 2002-203369 | 7/2002 |
| JP | 2002-203374 | 7/2002 |
| JP | 2002-216360 | 8/2002 |
| JP | 2002-304809 | 10/2002 |
| JP | 2002-311976 | 10/2002 |
| JP | 2002-319245 | 10/2002 |
| JP | 2002-367281 | 12/2002 |
| JP | 2003-006997 | 1/2003 |
| JP | 2004/037486 | 2/2004 |
| KR | 2001-0051834 | 6/2001 |
| KR | 2004-0048476 | 6/2004 |
| TW | 357346 | 5/1999 |
| TW | 408290 | 10/2000 |
| TW | 449737 | 8/2001 |
| TW | 501131 | 9/2002 |
| TW | 512238 | 12/2002 |
| TW | 512316 | 12/2002 |
| TW | 514895 | 12/2002 |
| WO | WO 97/45836 | 12/1997 |
| WO | WO 00/21085 | 4/2000 |
| WO | WO 01/003136 | 1/2001 |
| WO | WO 01/03136 | 1/2001 |
| WO | WO 01/52250 A1 | 7/2001 |
| WO | WO 02/15183 | 2/2002 |
| WO | WO 02/31821 A1 | 4/2002 |
| WO | WO 03/003358 | 1/2003 |
| WO | WO 02/37493 | 6/2003 |
| WO | WO 2004/066286 | 8/2004 |
| WO | WO 2004/095439 | 11/2004 |

OTHER PUBLICATIONS

Chinese Office Action corresponding to Chinese Application No. 200480000399.8 dated Dec. 19, 2008.
Japanese Office Action dated Dec. 15, 2009 for corresponding Japanese Patent Application No. 2008-319384.
European Office Action dated Dec. 14, 2009 for corresponding European Patent Application No. 06001614.4.
Japanese Office Action dated Aug. 20, 2008.
Chinese Office Action dated Jul. 4, 2008.
International Search Report dated Apr. 28, 2004.
International Search Report dated May 6, 2004.
International Search Report dated May 18, 2004.
Korean Office Action dated Mar. 28, 2005.
Korean Office Action dated Mar. 30, 2006.
European Search Report dated Jun. 12, 2006.
European Search Report dated Sep. 22, 2006.
European Search Report dated Nov. 24, 2006.
Russian Office Action dated Jan. 30, 2007.
Taiwanese Office Action dated Jul. 10, 2007.
Japanese Office Action dated Aug. 24, 2007.
European Search Report dated Oct. 29, 2007.

European Search Report dated Nov. 7, 2007.
Japanese Office Action dated Jan. 16, 2008.
Japanese Office Action dated Jan. 16, 2008.
Japanese Office Action dated Jan. 16, 2008.
Japanese Office Action dated Jan. 16, 2008.
European Search Report dated Mar. 12, 2008.
Japanese Office Action dated Mar. 17, 2008.
Japanese Office Action dated Mar. 24, 2008.
European Search Report dated Mar. 26, 2008.
European Search Report dated Apr. 2, 2008.
Japanese Office Action dated Jun. 16, 2009.
Japanese Office Action corresponding to Japanese Application No. 2006-500635 dated Aug. 26, 2008.
Japanese Office Action dated Jan. 12, 2010 for corresponding Japanese Patent Application No. 2007-243684.
Japanese Office Action dated Jul. 14, 2009.
Korean Office Action dated Jul. 18, 2009.
Japanese Office Action dated Jul. 21, 2009.
Taiwanese Office Action dated Jan. 24, 2010 in corresponding Taiwanese Application No. 095114984, with English translation.
Taiwanese Office Action dated Jun. 17, 2010 in corresponding application TW93101547, with English translation.
Office Action dated Jul. 13, 2010 in corresponding U.S. Appl. No. 10/516,910.
Taiwanese Office Action dated Aug. 5, 2010 in corresponding Application No. 093101544.
U.S. Office Action dated Nov. 10, 2010 in related U.S. Appl. No. 11/357,059.

* cited by examiner

*BD-RE (Blu-ray Rewritable)*

Lead-In Area ─── Guard 1
               ─ PIC
               ─ Guard 2
               ─ Info 2
               ─ OPC
               ─ reserved
               ─ Info 1

*Biphase modulated HFM groove*

BD-ROM (Blu-ray ROM)

FIG. 5

| Byte number | Contents | number of bytes |
|---|---|---|
| 0 | Disc Information identifier = "DI" | 2 |
| 2 | DI format | 1 |
| 3 | Reserved = 00h | 1 |
| 4 | Number of DI frames in each DI Block | 1 |
| 5 | DI Frame sequence number in DI Block | 1 |
| 6 | Number of DI bytes in use in this DI Frame | 1 |
| 7 | Reserved = 00h | 1 |
| 8 to 10 | disc type identifier = "BDO" | 3 |
| 11 | disc size / version | 1 |
| 12 | disc structure | 1 |
| 13 | channel bit length | 1 |
| 14 to 15 | Reserved = all 00h | 2 |
| 16 | BCA descriptor | 1 |
| 17 | maxium transfer rate of application | 1 |
| 18 to 23 | Reserved = all 00h | 6 |
| 24 to 31 | Data zone allocation | 8 |
| 32 to 111 | Reserved = all 00h | 13 |

*where CPI_rec_Flag (1Byte) is allocated*

FIG. 6

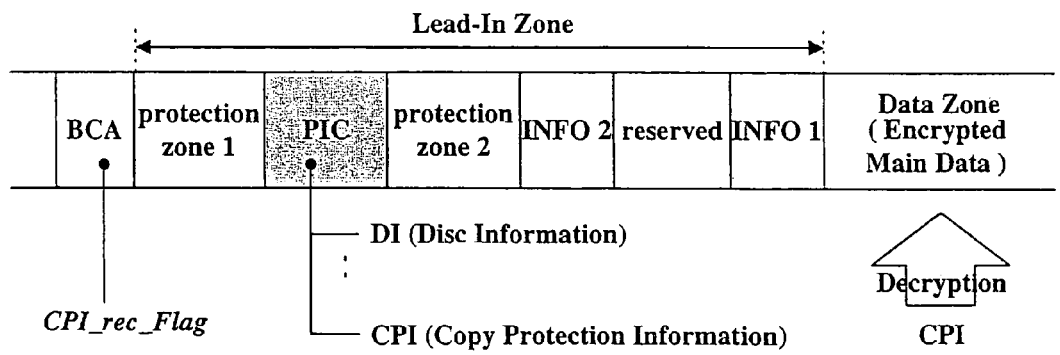

*CPI_rec_Flag*

— DI (Disc Information)
— CPI (Copy Protection Information)

RECORDING MEDIUM WITH COPY PROTECTION INDICATING INFORMATION AND APPARATUS AND METHODS FOR FORMING, RECORDING, REPRODUCING AND RESTRICTING REPRODUCTION OF THE RECORDING MEDIUM

CROSS-REFERENCE TO RELATED APPLICATIONS

This is a divisional application of, and claims priority under 35 U.S.C. §120 on, U.S. application Ser. No. 10/762,536, filed Jan. 23, 2004, the entire contents of which are incorporated by reference, which claims priority of Korean Patent Application No. 2003-004488, filed on Jan. 23, 2003; and Korean Patent Application No. 2003-008317, filed on Feb. 10, 2003, both in the Korean Intellectual Property Office, the entire contents of which are hereby incorporated by reference.

BACKGROUND OF THE INVENTION

1. Field of the Invention

The present invention relates to a recording medium such as BD-ROM (Blu-ray Disc ROM), which includes copy protection indicating information and an apparatus and methods for forming, recording, reproducing, and restricting reproduction of illegally duplicated recording media.

2. Description of the Related Art

Recently, standardization of a new high-density optical disc, a rewritable Blu-ray disc (BD-RE: Blu-ray Disc-Rewritable), have been under development where large quantities of high quality video and audio data can be recorded. Once the standard of a BD-RE has been established, products adopting the new optical discs are expected to be commercially available in the near future.

As illustrated in FIG. 1, a BD-RE has an inner hole; clamping area, transition area, BCA (Burst Cutting Area) area, and lead-in area, located in sequential order along radial direction. A data area and lead-out area reside in the center and outermost annulus of the disc, respectively.

The lead-in area is partitioned into a first guard (Guard 1) area, PIC (Permanent Information & Control data) area, a second guard (Guard 2) area, Info 2 area, OPC (Optimum Power Calibration) area, etc. The first guard area and PIC area are pre-recorded areas, whereas the remaining lead-in areas, data area, and lead-out area correspond to rewritable areas which can be overwritten with new data.

General information of a disc which needs to be permanently preserved may be recorded in the PIC area, which can be encoded in wobbled grooves of a track by HFM (High Frequency Modulation) method. HFM Grooves may be modulated in the radial direction with a rather high bandwidth signal, to create a data channel for replicated information with sufficient capacity and data rate. As shown in FIG. 2, encoding data into wobbled groove can be performed by bi-phase modulation and thus recording.

In this modulation method, a bit with value 0 may be represented by a transition at the start of the bit cell and a bit with value 1 may be represented by a transition at the start and in the middle of the bit cell. The modulated bits may be recorded on the disc by a deviation of the groove from its average centerline as indicated in FIG. 2. The length of each bit cell may be 36 T, where T corresponds to the length of a channel bit in the rewritable data areas.

Along with the development of a BD-RE, has been the development of a corresponding read-only disc, a read-only Blu-ray disc (hereinafter, referred to as 'BD-ROM'). As shown in FIG. 3, the BD-ROM disc may include an inner area, clamping area, transition area, information area, and rim area.

The main data of an audio/video (A/V) stream recorded in a data zone within an information area can be recorded with encryption with copy protection information (CPI) to prevent unauthorized copy.

Various disc information (DI) about the disc, such as the type of a disc, may be recorded in the PIC area within the information area. When encrypted main data are recorded in the data zone, copy protection information (CPI) for decryption can also be recorded in PIC area.

When an optical disc apparatus playing a recording medium performs initial servo operations in accordance with the insertion of a disc, copy protection information (CPI) recorded in the PIC area is detected. If main data recorded in a pre-recorded data area is found to be encrypted, the main data is output after decryption using the copy protection information.

Even when copy protection information is not recorded in the PIC area because the contents recorded in data area of a BD-ROM are not encrypted, an optical disc apparatus performing initial servo operations still performs a series of operations to detect copy protection information in the PIC area under the assumption that encryption has been applied to the contents. Such a preliminary operation can cause a delay in the playback of actual data. Also, if any data is recorded on the rewritable disk, i.e., BD-RE, or recordable disk, i.e., BD-WO and its data is copy protected, a similar problem exists when the data is reproduced.

Further, if copy protection information is not detected, it cannot be determined whether there is no copy protection information initially because the disc is an illegal medium, or there is no copy protection information because the disc is a legal and copy-free medium.

SUMMARY OF THE INVENTION

In exemplary embodiments, the present invention is directed to a recording medium, such as a high-density and/or read-only recording medium, such as BD-ROM, which includes copy protection indicating information, which can identify whether copy protection information is needed or not for the playback of contents stored on the recording medium, and to methods and apparatuses for forming, recording, and reproducing data on the recording medium.

In exemplary embodiments, the present invention is directed to a recording medium, such as a high-density and/or read-only recording medium, such as BD-ROM, which includes information in a particular area indicating whether or not copy protection information to decrypt recorded contents is present, and to methods and apparatuses for forming, recording, and reproducing data on the recording medium.

In exemplary embodiments, the present invention is directed to a recording medium, such as a high-density and/or read-only recording medium, such as BD-ROM, which includes information regarding the presence of copy protection information in the disc information, and to methods and apparatuses for forming, recording, and reproducing data on the recording medium.

In exemplary embodiments, the present invention is directed to a recording medium, such as a high-density and/or read-only recording medium, such as BD-ROM, which includes information regarding the presence of copy protection information as header information of a copy protection information field, and to methods and apparatuses for forming, recording, and reproducing data on the recording medium.

In exemplary embodiments, the present invention is directed to a recording medium, such as a high-density and/or read-only recording medium, such as BD-ROM, which includes copy protection indicating information, which is used to determine whether copy protection information is present and whether decryption is necessary, and to methods and apparatuses for forming, recording, and reproducing data on the recording medium.

In exemplary embodiments, the present invention is directed to a recording medium, such as a high-density and/or read-only recording medium, such as BD-ROM, which includes copy protection indicating information, which is used to determine whether copy protection information is present and whether decryption is necessary, playback of contents is directly started, irrespective of whether or not recorded contents have been encrypted, and to methods and apparatuses for forming, recording, and reproducing data on the recording medium.

In exemplary embodiments, the present invention is directed to a recording medium, such as a high-density and/or read-only recording medium, such as BD-ROM, which includes copy protection indicating information indicating whether or not the recording medium contains copy protection information for use in decrypting the recorded data, wherein the copy protection indicating information and/or the copy protection information are recorded in wobbled pre-pit pattern on an area of the recording medium.

In exemplary embodiments, the present invention is directed to a method for copy protection, which includes utilizing copy protection indicating information to indicate whether or not the recording medium contains copy protection information for use in decrypting the data, to reproduce the data, wherein the copy protection indicating information and/or the copy protection information are recorded in wobbled pre-pit pattern on an area of the recording medium.

In exemplary embodiments, the present invention is directed to a method for copy protection, which includes detecting copy protection indicating information indicating whether or not the recording medium contains copy protection information for use in decrypting the data, wherein the copy protection indicating information and/or the copy protection information are recorded in wobbled pre-pit pattern on an area of the recording medium; and playing the data utilizing the copy protection information if the recording medium contains copy protection information for use in decrypting the data, or playing the data directly without utilizing the copy protection information, if the recording medium does not contain copy protection information for use in decrypting the data, based on the detected copy protection indicating information.

In exemplary embodiments, the present invention is directed to a method for copy protection, which includes utilizing copy protection indicating information to indicate whether or not the recording medium contains copy protection information for use in decrypting the data, wherein the copy protection indicating information and/or the copy protection information are recorded in wobbled pre-pit pattern on an area of the recording medium.

In exemplary embodiments, the present invention is directed to an apparatus for copy protection, wherein said apparatus utilizes copy protection indicating information to determine whether or not the recording medium contains copy protection information for use in decrypting the data, to reproduce the data based on the copy protection indicating information and the copy protection information, wherein the copy protection indicating information and/or the copy protection information are recorded in wobbled pre-pit pattern on an area of the recording medium.

In exemplary embodiments, the present invention is directed to an apparatus for copy protection, which includes a detector detecting signals recorded on the recording medium, the signal including copy protection indicating information to determine whether or not the recording medium contains copy protection information for use in decrypting the data, wherein the copy protection indicating information and/or the copy protection information are recorded in wobbled pre-pit pattern on an area of the recording medium; and a signal processor for playing the data utilizing the copy protection information if the recording medium contains copy protection information for use in decrypting the data, or playing the data directly without utilizing the copy protection information, if the recording medium does not contain copy protection information for use in decrypting the data based on the copy protection indicating information.

BRIEF DESCRIPTION OF THE DRAWINGS

The accompanying drawings, which are included to provide a further understanding of the invention, illustrate exemplary embodiments of the invention, and together with the description, serve to explain the principles of the present invention.

In the drawings:

FIG. 5 is a diagram illustrating the fields of disc information recorded and managed in a high-density Blu-ray disc, wherein a flag indicating the presence of copy protection information is included in an exemplary embodiment of the present invention;

FIG. 6 is a diagram illustrating an exemplary embodiment wherein recorded in the BCA area of a Blu-ray disc according to the present invention is information indicating whether or not copy protection information is recorded;

DETAILED DESCRIPTION OF EXEMPLARY EMBODIMENTS

Hereinafter, a high-density read-only recording medium according to exemplary embodiments of the present invention and exemplary embodiments of apparatuses and methods for forming, recording, and reproducing copy protection information will be described in detail with reference to the appended drawings.

Figure 3:
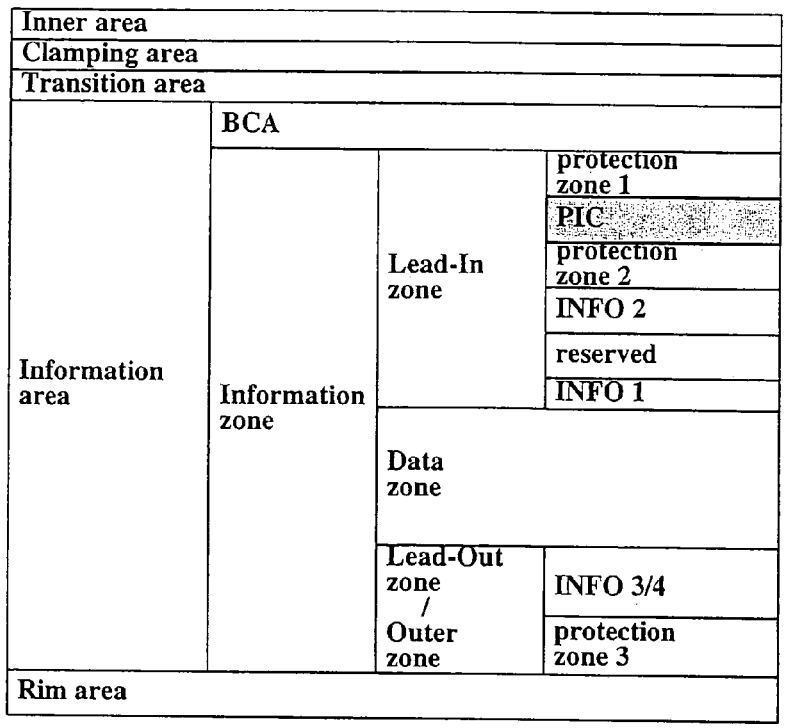
FIG. 3 is a diagram illustrating each area allocated in a read-only Blu-ray disc (BD-ROM) in an exemplary embodiment of the present invention.

As stated above with reference to FIG. 3, a read-only Blu-ray disc (BD-ROM) according to exemplary embodiments of the present invention has a disc structure including inner area, clamping area, transition area, information area, and rim area.

Figure 4:
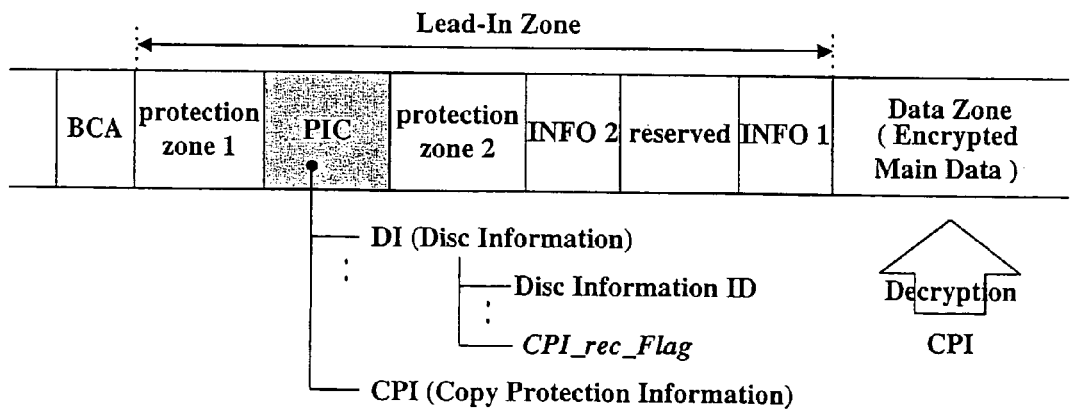
FIG. 4 is a diagram illustrating an exemplary embodiment wherein information regarding the presence of copy protection information is recorded in the PIC area of a Blu-ray disc according to an exemplary embodiment of the present invention.

As shown in FIG. 4, disc information corresponding to general information of a disc as well as encrypted main data recorded in data zone, for example, copy protection information required to decrypt A/V data streams may be recorded in the PIC area allocated in the information area.

When the main data is recorded without encryption in the data zone, the copy protection information need not be particularly recorded in the PIC area.

Accordingly, a flag to indicate whether or not copy protection information is recorded in the PIC area may be included in the disc information recorded in the PIC area. The flag (CPI_rec_Flag) indicates the presence of copy protection information and may have a recording size of one byte.

As shown in FIG. 5, one byte is allocated to record the flag indicating the presence of copy protection information within the area reserved for the disc information.

Also, the disc information in the PIC area can be recorded for several times. The flag byte may be recorded only in the first disc information among multiple of disc information which are recorded repeatedly in the PIC area.

As illustrated in FIG. 6, the flag indicating whether or not the copy protection information is recorded may be recorded in another area, e.g., the BCA (Burst Cutting Area) area allocated in the inner ring of the PIC area wherein copy protection information is recorded.

Copy protection information, along with the flag indicating the presence thereof, may be encoded and recorded in wobbled pits rather than in straight pits where data are recorded in general case. To this purpose, pits may be formed in wobbled pattern (or in a zigzag pattern) within as many track sections as needed. Also, it may be encoded and recorded in wobbled pits and straight pits alternatively and/or intermittently within the PIC area. Otherwise, it may be selectively or repeatedly recorded on other area except for the PIC area. It may be recorded by an HFM groove wobbled method such as BD-RE.

The copy protection information may include a key value for encrypting the main data to be recorded on data area.

Figure 7:
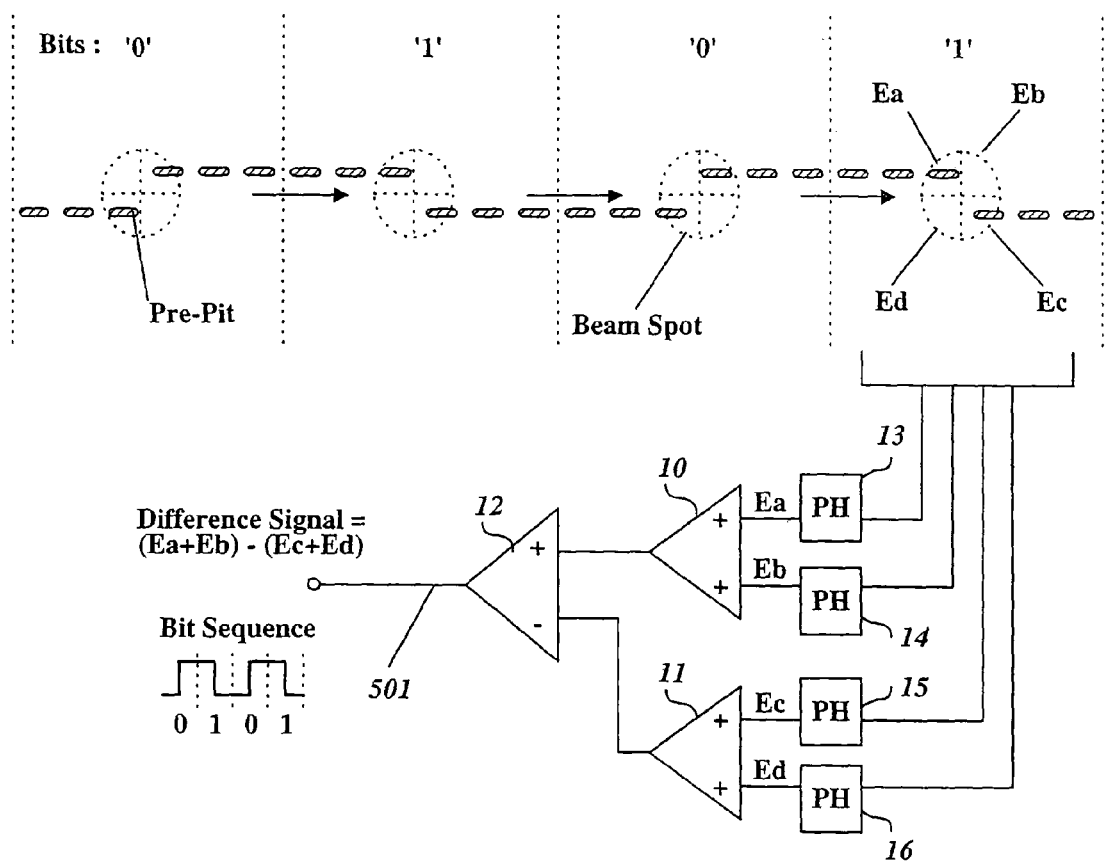
FIG. 7 is a diagram illustrating a process restoring data encoded in wobbled pits according to an exemplary embodiment of the present invention.

FIG. 7 is a diagram illustrating an example where data is encoded in wobbled pits by bi-phase modulation, whereby data are detected. In FIG. 7, the value of '0101' is encoded in bi-phase modulated form, e.g., bi-phase modulated HFM Groove, along with wobbled pattern of wobbled pits. The recording example of wobbled pits in FIG. 7 comprises 36 Ts (including marks and spaces) where six 3 T signals (mark) make up of the value of one bit. In the example, left and right transition of a sequence of six pits denoting '1' and a sequence of six pits denoting '0' are provided in opposite directions.

Figure 1:
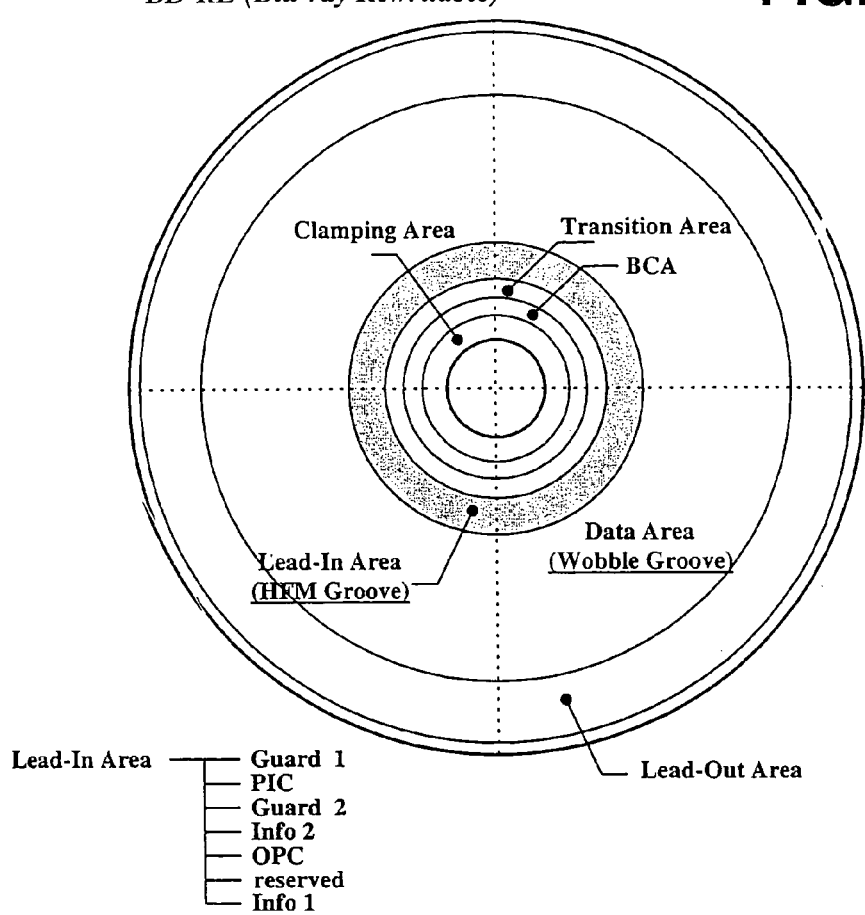
FIG. 1 is a diagram illustrating the disc structure of a conventional rewritable Blu-ray disc (BD-RE)
Figure 2:
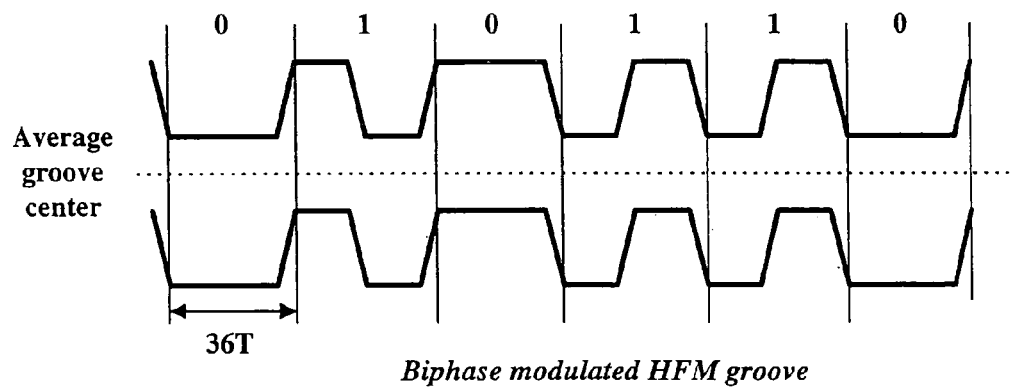
FIG. 2 is a diagram illustrating the high frequency modulation (HFM) groove formed in the PIC area of a rewritable Blu-ray disc.

As shown in FIG. 7. the structure by bi-phase modulation is different from the structure illustrated in FIG. 2. That is, the method of FIG. 2 has a bit with value 0, which is represented by a transition at the start of the bit cell and a bit with value 1, which is represented by a transition at the start and in the middle of the bit cell. Otherwise, the method of FIG. 7 has a bit with value 0, which is represented by a transition at the start of low and in the middle of high, and a bit with value 1, which is represented by the transition in the opposite direction. The combination of bits consists of data to detect information recorded as wobbled pit. The wobbled pit can be copy protection information, i.e., key data to decrypt main data recorded on the data zone of the recording medium as shown in FIG. 4A to 4F That is, the wobbled pit data can be reproduced or detected only when the bi-phased modulation data is detected or reproduced normally. And also, reproduction or decryption of main data is possible only when the wobbled pit data for copy protection is reproduced or detected using the normally detected or reproduced bi-phase modulation data.

When information is recorded in pits, identical pits need not be repeated but modulated varying pits (2 T-8 T) in accordance with input information may be recorded. In this case, too, however, the position of a pit sequence (namely, phase) is shifted approximately by every 18 Ts in order to encode data into wobbled pattern of wobbled pits.

The reflected light reflected from wobbled pits recorded in such a manner undergoes a photoelectric transform by four quadrant light receiving elements 13-16.

As illustrated in FIG. 7, THE photoelectrically transformed electrical signals (Ea, Eb, Ec, Ed) are amplified by a circuit for conventional push-pull track control. More specifically, left and right-side signals of the track (Ea+Eb, Ec+Ed) are amplified by respective amplifiers 10, 11 and the difference signal 501 of the left and right-side signals ((Ea+Eb)−(Ec+Ed)) is output by a differential amplifier 12. When the difference signal 501 is converted a binary signal based on whether its level is above or below a reference, encoded data in wobbled pattern of wobbled pits may be obtained.

Because signals detected from the wobbled pattern of wobbled pits are not available externally, even if data played from a BD-ROM were copied onto another recording medium other than the BD-ROM, playback of the copied data would be impossible.

Instead of recording data in wobbled pattern, if data were recorded in the PIC area according to a different agreement for recording format between manufactures having legal authorities, copying a BD-ROM by unauthorized manufactures can also be made more difficult.

Figure 8:
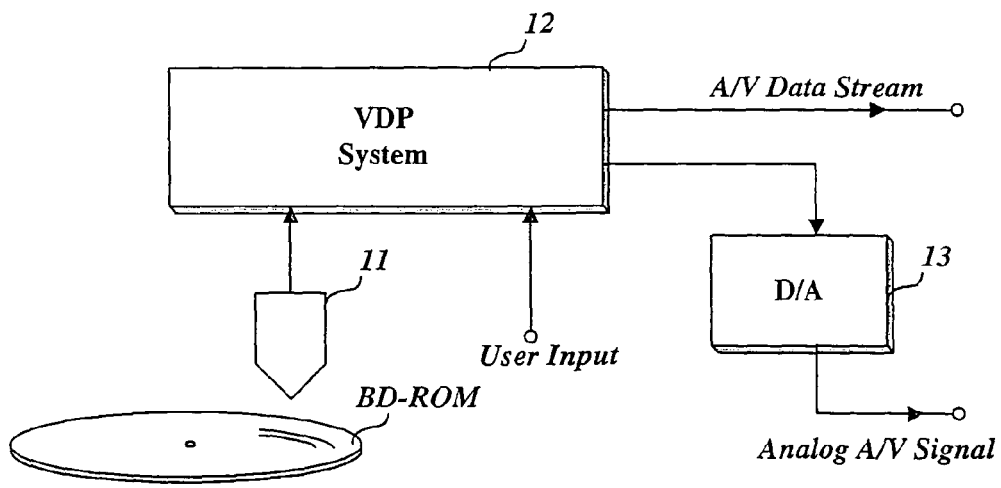
FIG. 8 is a diagram illustrating a simplified structure of an optical disc apparatus capable of playing a high-density Blu-ray disc in accordance with an exemplary embodiment of the present invention.
Figure 9:
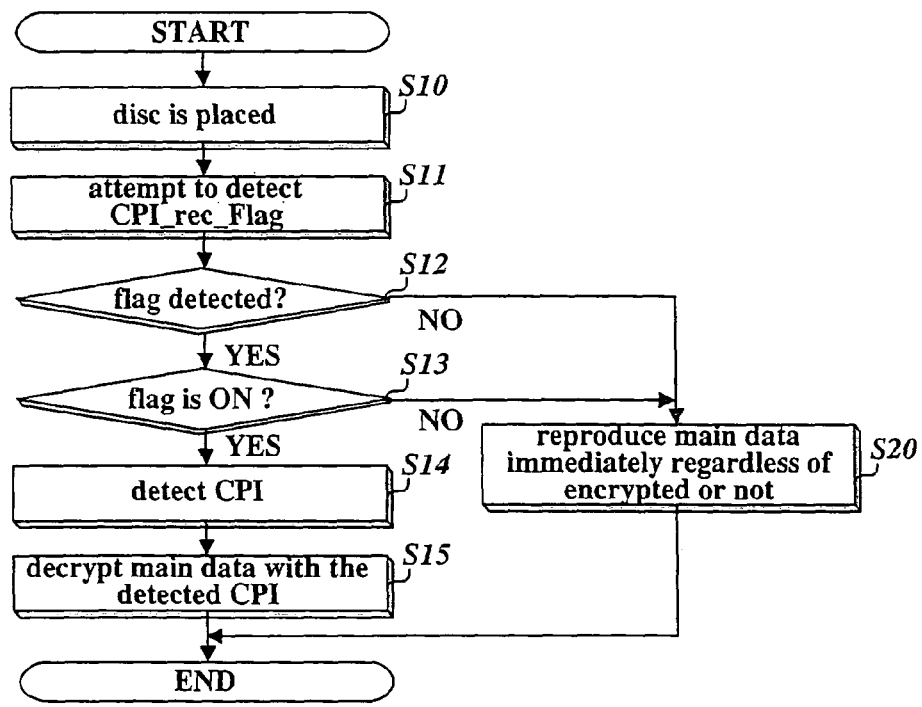
FIG. 9 is a flowchart illustrating the process of playing a high-density Blu-ray optical disc according to an exemplary embodiment of the present invention.

FIG. 8 is a simplified diagram illustrating an optical disc apparatus playing a recording medium of a disc. The apparatus includes an optical pickup 11; VDP (Video Disc Play) system 12 performing signal processing and servo control; and a D/A converter 13. The optical disc apparatus may perform playback processing according to whether or not copy protection information is recorded, as described in conjunction with FIG. 9.

The VDP system 12 of the disc apparatus detects and checks a flag (CPI_rec_Flag) indicating whether or not copy protection information among disc information recorded in the PIC area or encoded in the wobbled pits of an inserted BD-ROM is recorded (S11); otherwise, a flag recorded in the BCA area of a BD-ROM is detected (S11), whereby it is determined whether or not copy protection information is recorded.

If the flag is detected, its value is checked (S13). If the value indicates that copy protection information is recorded, the VDP system 12 of the optical disc apparatus performs (S14) the operation of detecting copy protection information recorded in the PIC area or encoded in the wobbled pits; thereafter, by using the copy protection information, a series of data play operations decrypting and playing encrypted data recorded in the data zone are performed (S15).

When the value of the flag indicates the absence of copy protection information or the flag indicating the presence of copy protection information is not detected, the VDP system 12 omits unnecessary operations to detect non-existent copy protection information in the PIC area, but directly performs the operations of reading out recorded contents in the data area.

As shown in the exemplary embodiment of FIG. 5, the flag indicating whether or not copy protection information is recorded, instead of being included and recorded in the disc information, may be recorded in the PIC area together with copy protection information.

Figure 10:
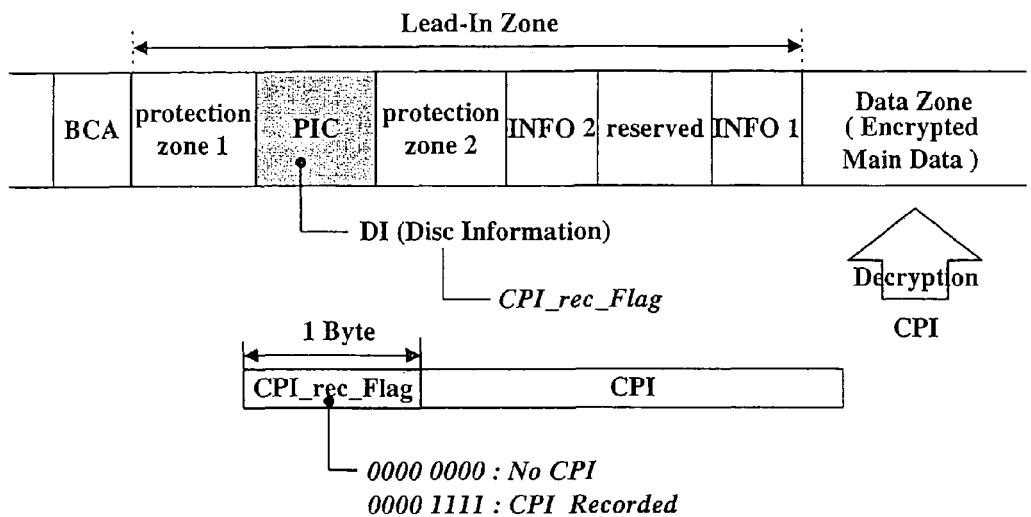
FIGS. 10 and 11 are diagrams illustrating respectively the exemplary embodiments according to the present invention, wherein recorded in a Blu-ray disc are information indicating whether or not copy protection information is recorded.

FIG. 10 is an exemplary embodiment illustrating such an arrangement. As shown in the exemplary embodiment of FIG. 10, the flag (CPI_rec_Flag) indicating the presence of copy protection information may be recorded as header information of copy protection information field.

The flag indicating whether or not copy protection information is recorded may have a recording size of one byte. When the value of the flag is '0000 0000', the flag indicates that copy protection information is not recorded (in this case, a succeeding copy protection information field may be filled with '00'.) When the value of the flag is '0000 1111', the flag indicates that copy protection information is recorded.

In other exemplary embodiments, copy protection information having a flag indicating whether or not copy protection information is recorded as a header information can be recorded in a particular recording area other than the PIC area, for example, the BCA area.

Copy protection information having a flag indicating whether or not copy protection information is recorded can be recorded in a field of disc information stored in the PIC area. Alternatively, it may be recorded as an independent structure from the disc information.

Figure 11:
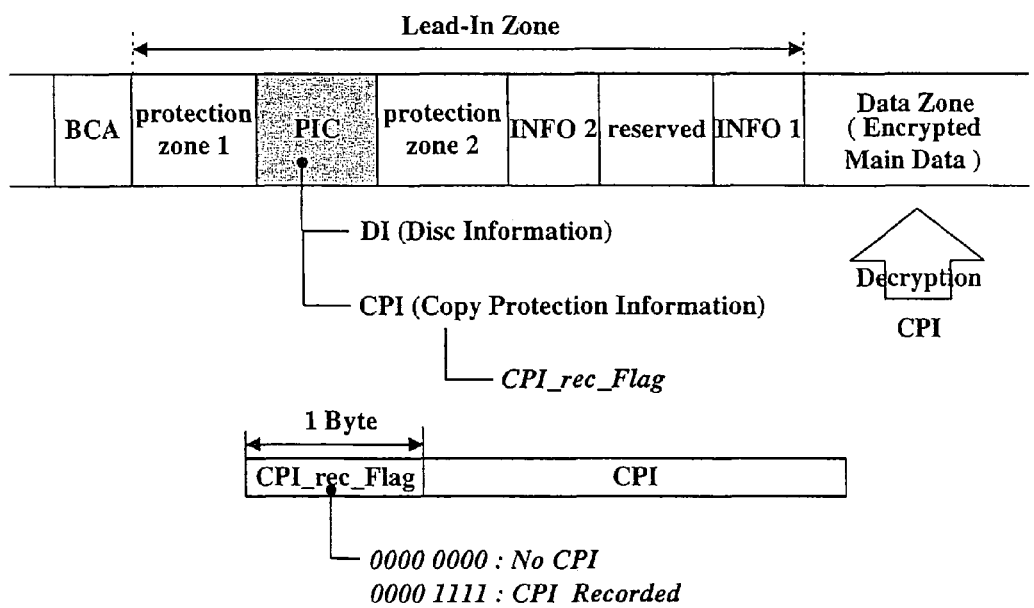

FIG. 11 describes an exemplary embodiment wherein copy protection information is recorded in the PIC area independently of the disc information.

In the exemplary embodiment of FIG. 11, the flag indicating whether or not copy protection information is recorded also appears in the header of copy protection information. When the value of the flag is '0000 0000', the flag indicates that copy protection information is not recorded (In this case, succeeding copy protection information field may be filled with the value of '00'.) When the value of the flag is '0000 1111', the flag indicates that copy protection information is recorded.

As described above, a high-density read-only recording medium and methods for recording copy protection information/playing thereof according to exemplary embodiments of the present invention allows a direct playback of contents stored in a high-density read-only disc unless the contents had been encrypted, whereas proper playback is achieved by reading out decryption information from the disc when encryption has been applied to the contents.

In addition, information for decoding encrypted data is recorded in a form of copy-resistant wobbled pits, whereby illegal copy of the contents stored in a high-density read-only disc is prohibited.

Although exemplary embodiments of the present invention have been described in conjunction with a high-density, read-only recording medium, the teachings of the present invention are also applicable to other recording media, such as recordable, rewritable, or rewritable once media and methods and apparatuses associated therewith, as would be known to one of ordinary skill in the art.

The foregoing description of exemplary embodiments of the present invention has been presented for purposes of illustration; therefore, those skilled in the art may utilize the invention and various embodiments with improvements, modifications, substitutions, or additions within the spirit and scope of the invention as defined by the following appended claims.

What is claimed is:

1. A recording medium, comprising:
a lead-in zone storing a control information unit configured to control recording or reproducing main data on the recording medium, the control information unit including an identifier indicating whether or not the recording medium contains copy protection information for use in decrypting or encrypting main data, the control information unit further including at least medium size information, medium structure information, and data zone allocation information, a plurality of the control information units being repeated in the lead-in zone, the repeated control information units and/or the copy protection information being formed as a wobbled pattern on an area of the recording medium, the repeated control information units and the copy protection information being recorded in different areas of the recording medium from each other; and
a data zone configured to store the main data; wherein each control information unit of the plurality of control information units includes identical information as each other control information unit.

2. The recording medium according to claim 1, wherein the main data is reproduced utilizing the copy protection information if the recording medium contains copy protection information for use in decrypting the main data, or the main data is reproduced directly without utilizing the copy protection information, if the recording medium does not contain copy protection information for use in decrypting the main data.

3. The recording medium according to claim 2, wherein the recording medium does not contain copy protection information for use in decrypting the data if the identifier indicates the recording medium does not contain copy protection information.

4. The recording medium of claim 1, wherein the copy protection information includes a key value for encrypting/decrypting the main data.

5. The recording medium of claim 4, wherein the copy protection information is selectively or repeatedly recorded on the recording medium.

6. The recording medium of claim 1, wherein the identifier and the copy protection information are recorded in a lead-in area, of the recording medium, and wherein the identifier is followed by the copy protection information.

7. A method of forming a recording medium, comprising:
generating a control information unit to control a recording or reproducing of main data to be recorded or recorded on the recording medium, the control information unit including an identifier indicating if the recording medium is configured to contain copy protection information required for decrypting and encrypting the main data, the control information unit further including at least medium size information, medium structure information, and data zone allocation information;
forming a first area in the recording medium, a plurality of the control information units being repeated in the first area, the copy protection information not being formed in the first area, the repeated control information units and/or the copy protection information being formed as a wobbled pattern on an area of the recording medium; and forming a second area in the recording medium, the second area configured to store the main data; wherein each control information unit of the plurality of control information units includes identical information as each other control information unit.

8. The method of claim 7, wherein the first area is a lead-in area of the recording medium.

9. The method of claim 7, wherein the copy protection information is recorded repeatedly.

10. A method for reproducing data from a recording medium, the method comprising:

detecting an identifier indicating if the recording medium contains copy protection information for use in decrypting main data, the identifier being stored in a control information unit, the control information unit including information for controlling reproduction of the main data, the control information unit further including at least medium size information, medium structure information, and data zone allocation information, a plurality of the control information units being repeated on the recording medium, the plurality of repeated control information units and/or the copy protection information being formed as a wobbled pattern, the plurality of repeated control information units and the copy protection information being recorded in different areas of the recording medium from each other; and reproducing the main data using the copy protection information if the identifier indicates that the recording medium contains the copy protection information, or reproducing the main data directly if the identifier indicates that the recording medium does not contain the copy protection information; wherein each control information unit of the plurality of control information units includes identical information as each other control information unit.

11. The method of claim 10, wherein the detecting includes extracting the identifier from at least one of the plurality of repeated control information units.

12. The method of claim 10, wherein the copy protection information includes a key value for encrypting/decrypting the main data, and wherein the reproducing includes processing the main data using the key value.

13. The method of claim 12, wherein the copy protection information is repeatedly recorded in the recording medium, and wherein the reproducing includes detecting at least one repetition of the repeatedly-recorded copy protection information.

14. An apparatus for reproducing data from a recording medium, the apparatus comprising:

a signal detector configured to detect data from the recording medium by converting a beam reflected from the recording medium into electric signals corresponding to the data, the data including main data and a control information unit for controlling reproduction of the main data recorded on the recording medium, the control information unit including an identifier indicating if the recording medium contains copy protection information for use in decrypting the main data, the control information unit further including at least medium size information, medium structure information, and data zone allocation information, a plurality of the control information units being repeated on the recording medium, a plurality of the control information units being repeatedly recorded on the recording medium, the plurality of repeated control information units and/or the copy protection information being formed as a wobbled pattern, and the signal detector being configured to detect the copy protection information and at least one of the plurality of the repeated control information units in different areas of the recording medium from each other; and a signal processor configured to process the main data using the copy protection information if the identifier indicates that the recording medium contains the copy protection information, or reproduce the main data directly if the identifier indicates that the recording medium does not contain the copy protection information; wherein each control information unit of the plurality of control information units includes identical information as each other control information unit.

15. The apparatus of claim 14, wherein the copy protection information includes a key for encrypting/decrypting the main data, and wherein the signal processor is configured to process the main data using the key.

16. The apparatus of claim 15, wherein the copy protection information is repeatedly recorded in the recording medium, and the signal detector is configured to detect at least one repetition of the repeatedly-recorded copy protection information.

* * * * *